United States Patent
Liu et al.

(10) Patent No.: US 10,060,284 B2
(45) Date of Patent: Aug. 28, 2018

(54) ENGINE INLET TOTAL AIR TEMPERATURE SENSOR

(71) Applicant: UNITED TECHNOLOGIES CORPORATION, Farmington, CT (US)

(72) Inventors: Xuejun Liu, Avon, CT (US); Matthew R. Feulner, West Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 294 days.

(21) Appl. No.: 14/774,519

(22) PCT Filed: Dec. 16, 2013

(86) PCT No.: PCT/US2013/075352
§ 371 (c)(1),
(2) Date: Sep. 10, 2015

(87) PCT Pub. No.: WO2014/143264
PCT Pub. Date: Sep. 18, 2014

(65) Prior Publication Data
US 2016/0032757 A1 Feb. 4, 2016

Related U.S. Application Data

(60) Provisional application No. 61/800,185, filed on Mar. 15, 2013.

(51) Int. Cl.
*G01K 13/02* (2006.01)
*F01D 17/08* (2006.01)
(Continued)

(52) U.S. Cl.
CPC ......... *F01D 17/085* (2013.01); *F01D 21/003* (2013.01); *G01K 13/02* (2013.01);
(Continued)

(58) Field of Classification Search
CPC .................................................. G01K 13/028
See application file for complete search history.

(56) References Cited

U.S. PATENT DOCUMENTS 3,512,414 A   5/1970   Rees
4,783,026 A   11/1988  Rumford
(Continued)

FOREIGN PATENT DOCUMENTS

FR          2680872 A1 *  3/1993   ............. G01K 13/02
WO      WO 9425842 A1 *  11/1994   ............... G01K 1/08

OTHER PUBLICATIONS

European Search Report for Application No. EP 13877979.
(Continued)

*Primary Examiner* — Clayton E Laballe
*Assistant Examiner* — Leon W Rhodes, Jr.
(74) *Attorney, Agent, or Firm* — Cantor Colburn LLP (57) ABSTRACT

A total air temperature (TAT) sensor assembly is disclosed. The assembly includes a housing that accommodates a temperature sensor. The assembly also includes a first airfoil that includes a leading end and a trailing end and a second airfoil that includes a leading end and a trailing end. The first and second airfoils are disposed in a spaced-apart fashion that defines a curved passageway so incoming air can flow between the first and second airfoils before engaging the housing and the temperature sensor. The trailing ends of the airfoils are disposed on opposite sides of the housing and spaced apart from the housing to permit air flowing through the curved passageway to pass the housing.

19 Claims, 4 Drawing Sheets

(51) Int. Cl.
*F01D 21/00* (2006.01)
*B64D 33/00* (2006.01)

(52) U.S. Cl.
CPC .......... *B64D 33/00* (2013.01); *F05D 2260/80* (2013.01); *G01K 2013/024* (2013.01); *G01K 2205/02* (2013.01)

(56) References Cited

U.S. PATENT DOCUMENTS

| | | | |
|---|---|---|---|
| 5,484,122 A | | 1/1996 | Desalve |
| 5,653,538 A | * | 8/1997 | Phillips .................. G01K 13/02 |
| | | | 374/135 |
| 7,845,222 B1 | | 12/2010 | Goedel |
| 8,517,604 B2 | * | 8/2013 | Parsons ................ G01K 13/028 |
| | | | 374/158 |
| 9,310,256 B2 | * | 4/2016 | Parsons .................... G01K 1/16 |
| 9,429,481 B2 | * | 8/2016 | Agami ................. G01K 13/028 |
| 2011/0106475 A1 | | 5/2011 | Wigen |
| 2011/0211614 A1 | | 9/2011 | Gmelin et al. |
| 2012/0285261 A1 | | 11/2012 | Goedel |
| 2015/0114006 A1 | * | 4/2015 | Tan ........................... F02C 7/20 |
| | | | 60/797 |

OTHER PUBLICATIONS

International Search Report for related PCT Application No. PCT/US13/75353; dated Apr. 10, 2014.
European Office Action dated Apr. 25, 2018 for Application No. 13 877 979.8.

* cited by examiner

ENGINE INLET TOTAL AIR TEMPERATURE SENSOR

CROSS-REFERENCE TO RELATED APPLICATION

This Application is a US National Stage under 35 USC § 371 of International Patent Application No. PCT/US13/75352 filed on Dec. 16, 2013, and claims priority under 35 USC § 119(e) to U.S. Provisional Patent Application Ser. No. 61/800,185 filed on Mar. 15, 2013.

TECHNICAL FIELD

This disclosure relates to total air temperature sensors for jet engines. More particularly, this disclosure relates to total air temperature sensors that reduce inaccurate readings caused by total temperature recovery errors and correction biases.

BACKGROUND

Figure 1:
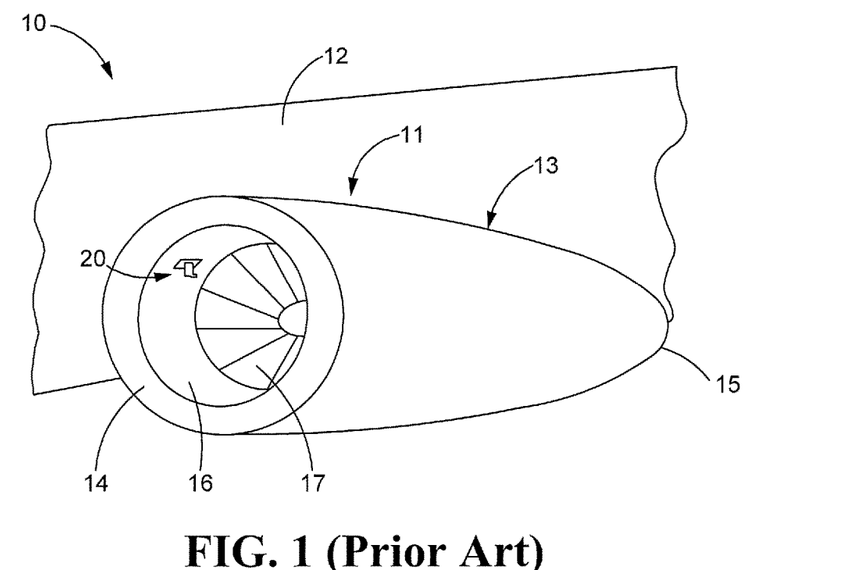
FIG. 1 is a perspective view of a TAT sensor disposed on an inner wall of a nacelle of a gas turbine engine that is coupled to a fuselage or wing.

In aviation, the total air temperature (TAT) is measured by a temperature sensor mounted on the surface of the aircraft. For example, FIG. 1 shows an aircraft 10 with an engine 11 mounted to a fuselage or wing 12. The nacelle 13 of the engine 11 includes a front end 14 for receiving air flow and an aft end 15 for exhausting air flow and combustion products. The nacelle 13 also includes an inner wall 16 disposed in front of the fan 17. A sensor assembly 20 is mounted on the inner wall 14. The sensor assembly 20 is designed to bring the air entering the engine 11 to rest relative to the aircraft 10. As the air is brought to rest, kinetic energy in the air is converted to internal energy. The air is compressed and experiences an adiabatic increase in temperature. Therefore, the TAT is higher than the static (or ambient) air temperature. However, the static air temperature is obtained from the TAT and the true airspeed of the aircraft 10 is calculated from the static air temperature. Thus, the TAT is an essential input to an air data computer in order to enable computation of the static air temperature and the true airspeed.

Conventional TAT sensors do not work properly in icing conditions. During flight in icing conditions, water droplets, and/or ice crystals, engage the sensor and can build up or accrete around the opening of the internal sensing element. An ice ridge can grow and eventually break free—clogging the sensor temporarily and causing an error in the TAT reading. To address this problem, some conventional TAT sensors have incorporated an elbow, or bend, to inertially separate these particles from the airflow before they reach the sensing element.

Other designs that enhance the anti-icing performance of the TAT sensors include heating elements embedded in or around the housing walls of TAT sensors or from hot air flowing through the sensors (e.g., from an aircraft engine). See, e.g., US 2011/0106475. Unfortunately, use of external heating also results in heating of the internal boundary layers of the air which, if not properly controlled, adversely affect the accuracy of TAT measurement. In short, the heat used to de-ice TAT sensors causes errors in the temperature reading, which are difficult to correct for.

Still other designs attempt to avoid the use of a heating element by employing a protective airfoil in front of the sensor and shields around the sensor as shown in U.S. Pat. No. 7,845,222 and depicted in FIG. 2. The prior art sensor 21 of the sensor assembly 20 is shielded from the incoming water droplets by the protective airfoil 22 and the shields 23, 24, wherein the airfoil 22 is disposed forward of the shields 23, 24 and sensor 21. This shielding prevents ice accretion on the sensor 21. However, placement of the airfoil 22 in front of the sensor 21 can cause the sensor 21 to be disposed in a wake or eddy region, leading to inaccurate measurements caused by recovery errors, which are also difficult to correct for.

Therefore, improved TAT sensor assemblies that accurately measure the TAT during icing conditions are still needed.

SUMMARY

In one aspect, a total air temperature (TAT) sensor assembly is disclosed. The disclosed assembly may include a housing for accommodating a temperature sensor. The assembly may also include a first airfoil that may include a leading end and a trailing end. The assembly also includes a second airfoil that may include a leading end and a trailing end. The leading ends of the first and second airfoils may be disposed in front of the housing and the first and second airfoils may be disposed in a spaced apart fashion to define a curved passageway extending between the first and second airfoils and leading to the housing.

In another aspect, a total air temperature and pressure sensor assembly is disclosed that may include a housing that accommodates a temperature sensor. The assembly may further include a first airfoil that may include a leading end and a trailing end and a second airfoil that, in turn, may include a leading end and a trailing end. The leading end of the first airfoil may be disposed in front of the leading end of the second airfoil. The first and second airfoils may be disposed at least partially in front of the housing in a spaced-apart fashion to define a curved passageway extending from the leading end of the second airfoil to the housing. The trailing ends of the first and second airfoils may be disposed on opposite sides of the housing and spaced apart from the housing to define a first gap between the trailing end of the first airfoil and the housing and a second gap between the trailing end of the second airfoil and the housing. The first and second gaps may be in communication with the curved passageway to provide outlets for air passing through the curved passageway and past the housing.

In another aspect, a method of sensing total air temperature of air flowing into a nacelle of a gas turbine engine is disclosed. The disclosed method may include providing a temperature sensor disposed within a housing mounted to the nacelle in a position to engage incoming air entering the nacelle before said incoming air engages working components of the gas turbine engine. The disclosed method may further include providing a first airfoil including a leading end and a trailing end and a second airfoil including a leading end and a trailing end. The disclosed method may further include positioning the first and second airfoils in a spaced-apart fashion and at least partially in front of the housing to define a curved passageway extending between the first and second airfoils and to the housing. Further, the disclosed method may include operating the engine to flow air through the curved passageway and engaging at least one of the first and second airfoils before reaching the housing.

In any one or more of the embodiments described above, the leading end of the first airfoil may be disposed in front of the leading end of the second airfoil.

In any one or more the embodiments described above, the trailing end of the second airfoil may be disposed in front of and spaced apart from the housing.

In any one or more the embodiments described above, the trailing ends of the first and second airfoils may be disposed on opposite sides of the housing and spaced apart from the housing.

In any one or more of the embodiments described above, the trailing end of the first airfoil may be spaced-apart from the housing to provide a first gap between the trailing end of the first airfoil and the housing. The first gap may be in communication with the curved passageway to provide an outlet for air flowing through the curved passageway and past the housing.

In any one or more the embodiments described above, the trailing end of the second airfoil may be spaced-apart from the housing to define a second gap between the trailing end of the second airfoil and the housing. The second gap may be in communication with the curved passageway to provide an outlet for air flowing to the curved passageway and past of the housing.

In any one or more the embodiments described above, the second airfoil may include an inner sidewall extending between the leading and trailing ends of the second airfoil and that faces and defines at least part of the curved passageway. The inner sidewall of the second airfoil may be at least partially convex.

In any one or more the embodiments described above, the first airfoil may include an inner sidewall extending between the leading and trailing ends of the first airfoil and that faces and defines at least part of the curved passageway. The inner sidewall of the first airfoil may be at least partially concave.

In any one or more the embodiments described above, the first airfoil may include an inner sidewall extending between the leading and trailing ends of the first airfoil and that faces and defines at least part of the curved passageway. The inner sidewall of the first airfoil may include a convex portion and a concave portion with the convex portion disposed between the leading end of the first airfoil and the concave portion.

In any one or more the embodiments described above, the first airfoil may include an inner sidewall extending between the leading and trailing ends of the first airfoil and that faces and defines at least part of the curved passageway. The inner sidewall of the first airfoil may include a first convex portion, a second convex portion and a concave portion disposed between the first and second convex portions.

In any one or more the embodiments described above, the second airfoil may include an outer sidewall extending between the leading and trailing ends of the second airfoil and that faces away from the curved passageway. The outer sidewall of the second airfoil may be at least partially convex.

In any one or more the embodiments described above, the first airfoil may include an outer sidewall extending between the leading and trailing ends of the first airfoil and that faces away from the curved passageway. The outer sidewall of the first airfoil may be at least partially convex.

In any one or more the embodiments described above, the first and second airfoils may each be coupled to at least one heating element.

In any one or more in the embodiments described above, the first and second airfoils may be coupled to the housing.

In any one or more the embodiments described above, the housing may also accommodate a pressure sensor.

DESCRIPTION

Figure 3A:
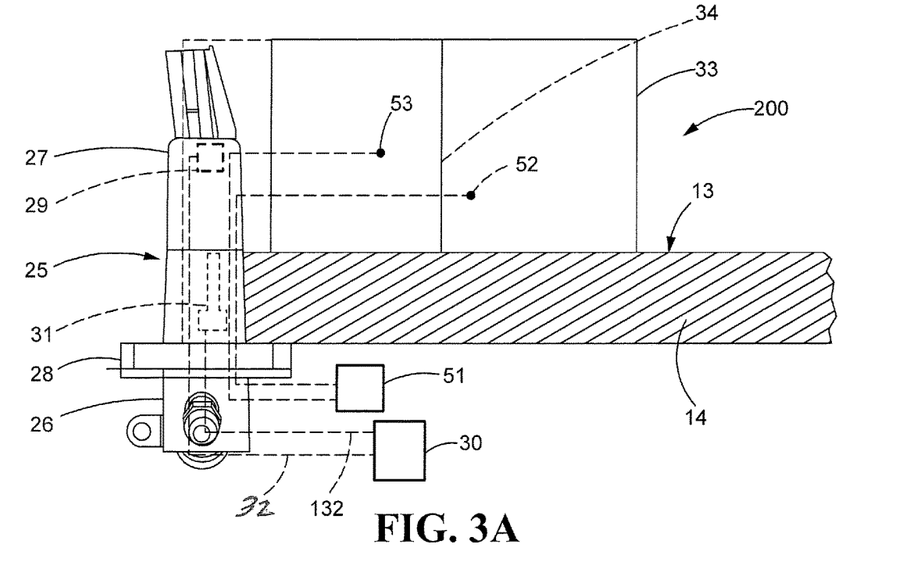
FIG. 3A is a top view of a disclosed sensor assembly mounted to an inner wall of a nacelle.
Figure 3B:
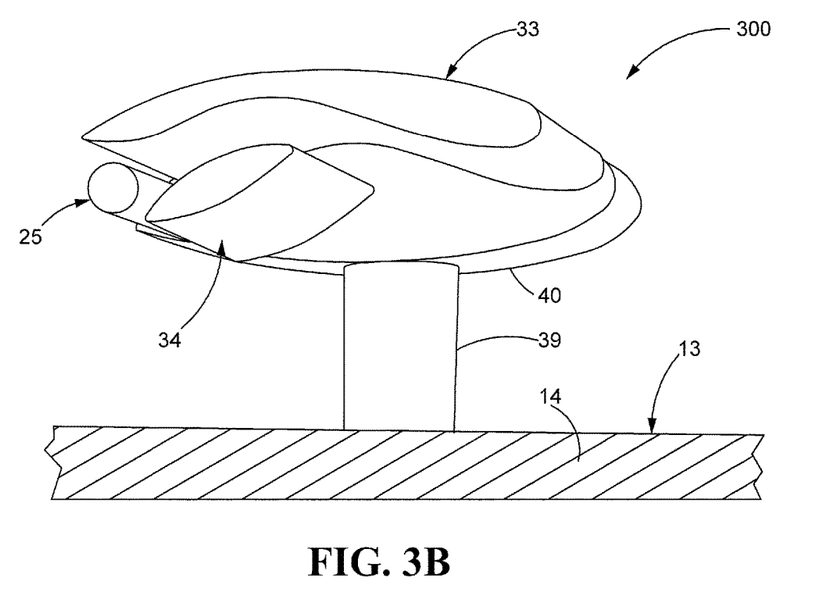
FIG. 3B is a side plan view of a disclosed sensor assembly mounted in a generally parallel relationship to an inner wall of a nacelle by a support.

FIG. 1 illustrates the placement of a prior art sensor assembly 20 on an inner wall 14 of the nacelle 13. Similarly, one disclosed TAT sensor assembly 200 shown in FIG. 3 is disposed at approximately the same position along the inner wall 14 as the sensor assembly 20 shown in FIG. 1. In other words, the disclosed sensor assembly 200 may be placed along the inner wall 14 of the nacelle 13 at about the 10 o'clock or 11 o'clock position.

Referring to FIG. 3A, the disclosed TAT sensor assembly 200 includes a housing 25 that may include a first end 26 and a second end 27. The first end 26 of the housing 25 may be disposed inside the inner wall 14 of the nacelle 13. The housing 25 may pass through a flange 28 which may be used to connect the TAT sensor assembly 200 to the inner wall 14. The first end 26 of the housing 25 may include at least one opening for at least one wire 32 that links a temperature sensor 29 to a controller 30. The TAT sensor assembly 200 may also include a pressure sensor 31 which may also be linked to the controller 30 via the wire 132.

Turning to FIG. 3B, an alternative means for mounting a TAT sensor assembly 300 to an inner wall 14 of a nacelle 13 is disclosed. A support 39 and a backing member 40 are used to connect the TAT sensor assembly 300 to the inner wall 14 of the nacelle 13. Using this arrangement, the airfoils 33, 34 of the TAT sensor assembly 300 may be disposed in a spaced-apart and generally parallel relationship to the inner wall 14 of the nacelle 13. This orientation as shown in FIG. 3B enables the TAT sensor assembly 300 to be effective over a wide range of angles of attack, i.e., the angular relationship between the incoming airflow and the TAT sensor assembly 300.

Figure 4:
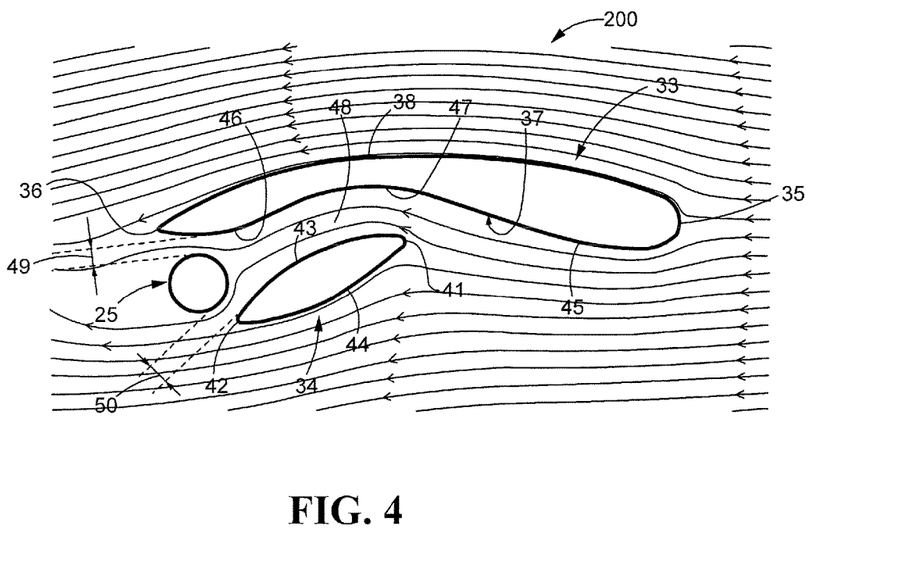
FIG. 4 is a side view of the sensor assembly shown in FIG. 3 illustrating the airflow field around and through the sensor assembly of FIG. 4.

Referring to FIGS. 3A-4, the TAT sensor assembly 200 may include a first airfoil 33 and a second airfoil 34. As noted above, the disclosed TAT sensor assembly 200 may also include the housing 25 which is shown schematically in FIG. 4. FIG. 4 illustrates the airflow field around the airfoils 33, 34 and the sensor housing 25. FIG. 4 also shows the relative positions of the first and second airfoils 33, 34 with respect to the housing 25. Specifically, the first airfoil 33 may include a leading end 35 and a trailing end 36. The first airfoil 33 may also include an inner sidewall 37 and an outer sidewall 38. Similarly, the second airfoil 34 may also include a leading end 41, a trailing end 42, an inner sidewall 43 and an outer sidewall 44. Both leading ends 35, 41 of the airfoils 33, 34 may be curved or convex. Further, the inner sidewall 37 of the first airfoil 33 may include a first convex portion 45, a second convex portion 46 and a middle concave portion 47. The outer sidewall 38 of the first airfoil 33 may be generally convex. In contrast, the inner sidewall 43 of the second airfoil 34 may be convex and the outer sidewall 44 of the second airfoil 34 may also be convex.

Further, the airfoils 33, 34 are spaced apart from each other to define a curved passageway 48. As shown by the airflow field of FIG. 4, incoming air is able to enter the curved passageway 48 disposed between the first and second airfoils 33, 34 and proceed towards the housing 25 of the temperature sensor 29. Thus, the housing 25 is not disposed within a wake or eddy, but, instead, is exposed to incoming airflow that has been moderately redirected by the curved passageway 48 as defined by the first and second airfoils 33, 34. Further, the trailing end 36 of the first airfoil 33 may be disposed in front of the housing 25 and may be spaced apart from the housing 25 by a first gap 49. The first gap 49 may receive a portion of the incoming air that flows through the curved passageway 48 and past the housing 25. Similarly, the trailing end 42 of the second airfoil 34 may be spaced apart from the housing 25 by a second gap 50. The second gap 50 enables a remaining portion of the incoming air to flow through the gap 50 as it passes the housing 25. By providing the first gap 49 and/or the second gap 50, airflow entering the curved passageway 48 between the airfoils 33, 34 may be directed towards and then past the housing 25 without forming eddies or wakes around the housing 25, which enhances the accuracy of the TAT measurement.

Figure 2:
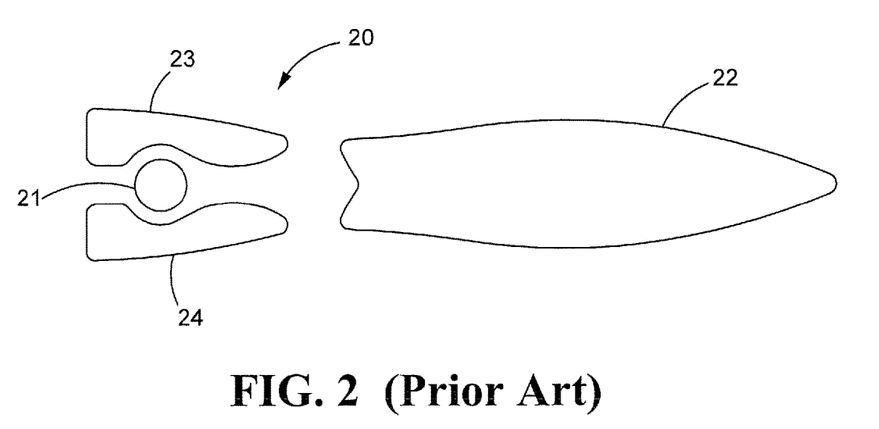
FIG. 2 is a side sectional view of a prior art TAT sensor.

Specifically, in contrast to the conventional TAT sensor assembly 20 shown in FIG. 2, the combination of providing the curved passageway 48 between the airfoils 33, 34 and at least one of the first or second gaps 49 or 50 disposed at or near the housing 25 may prevent the formation of a wake or eddy around the housing 25. Therefore, the housing 25 and temperature sensor 29 are not disposed in a wake or eddy thereby enhancing the accuracy of the TAT measurement and providing an improvement over prior art designs like that shown in FIG. 2.

Still referring to FIGS. 3A-4, the controller 30 may be linked to at least one power supply 51 that may be linked to one or more heating elements 52, 53. The heating element 52 may be coupled to the first airfoil 33 while the heating element 53 may be coupled to the second airfoil 34. In prior art designs, particularly like that shown in FIG. 3 that create a wake or eddy at or around the sensor 21, the use of heating elements and the airfoil 22 or shields 23, 24 could adversely affect the accuracy of the TAT measurement. However, with respect to the TAT sensor assembly 200 shown in FIGS. 3A-6, the use of the power supply 51 and heating elements 52, 53 does not adversely affect the accuracy of the TAT measurement because, without being bound by theory, the thermal boundary layers caused by the heating elements 52, 53 along the inner sidewalls 37, 43 of the airfoils 33, 34 respectively are sufficiently thin so that the heated air in the thermal boundary layers may pass through the gaps 49, 50 in close proximity to the first and second airfoils 33, 34 respectively without engaging the housing 25 or heating the housing 25. Thus, the use of the heating elements 52, 53 will not adversely affect the TAT measurement. In contrast, referring to FIG. 2, because the sensor 21 is disposed within a wake region, any heating element used on the airfoil 22 and/or the shields 23, 24 can result in heated air engaging the sensor 21 and adversely affecting the TAT measurement. The use of the power supply 51 and heating elements 52, 53 help to prevent formation and/or accumulation of ice on the airfoils 33, 34 and/or housing 25, without adversely affecting the accuracy of the TAT measurement.

Figure 5:
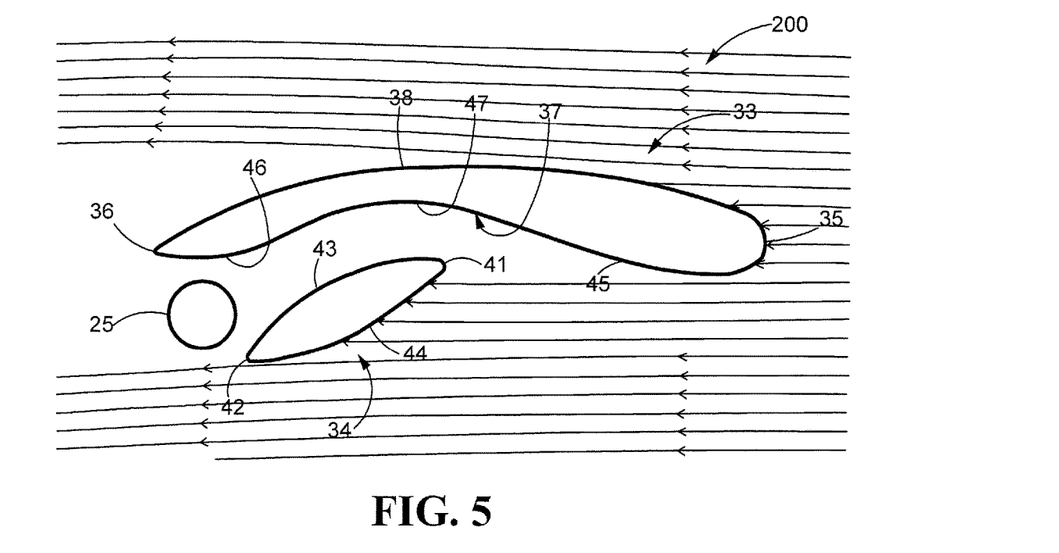
FIG. 5 is another side view of the sensor assembly shown in FIGS. 3 and 4 and further illustrates the water droplet trajectory for an engine travelling at a speed where the Mach number is about 0.6, the mean volume diameter of the water droplets is about 20 microns and the ambient liquid water content is about 1 g/m$^3$.

Turning to FIG. 5, in addition to providing sufficient airflow past the housing 25 so as to avoid the formation of a wake or eddy around the sensor housing 25, the TAT sensor assembly 200 may also prevent water droplets from engaging the sensor housing 25 and thereafter forming ice on the housing 25. Specifically, FIG. 5 illustrates the water droplet trajectory when the aircraft is traveling at the speed of about Mach 0.6, with water droplets having a mean volume diameter (MVD) of 20 microns and an ambient liquid water content (LWC) of about 1 g/m$^3$. The positioning and shape of the airfoils 33, 34 prevents water droplets from directly engaging the housing 25 before engaging the airfoils 33 or 34. Specifically, the inner sidewall 37 of the first airfoil 33 includes a first convex portion 45 disposed aft of the leading end 35 of the first airfoil 33 followed by a concave portion 47 which is then followed by another convex portion 46. Further, the inner sidewall 43 of the second airfoil 34 is also convex. The geometries of the inner sidewalls 37, 43 of the first and second airfoils 33, 34 respectively define the curved passageway 48 as shown in FIG. 4 and, as shown in FIG. 5, water droplets cannot engage the housing 25 without first engaging the first or second airfoils 33 or 34 respectively.

Further, while water droplets engage the airfoils 33, 34, the heating elements 52, 53 shown in FIG. 3A may be used to prevent or limit the formation of ice on the inner sidewall 37 of the first airfoil 33 and/or the inner sidewall 43 of the second airfoil 34, which avoids the problem of ice buildup on the airfoils 33, 34. As noted above, ice can become dislodged and possibly clog the housing 25, which would adversely affect the accuracy of the TAT measurement.

Figure 6:
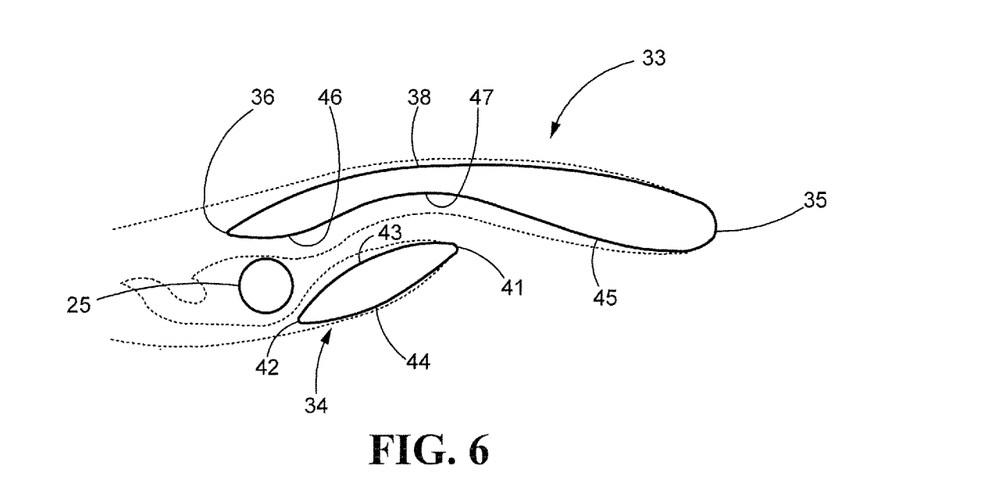
FIG. 6 is another side view of the TAT assembly shown in FIGS. 3-5, particularly illustrating the total temperature field around the sensor assembly and airfoil structures of the sensor assembly when traveling at a Mach speed of about 0.6.

Turning to FIG. 6, a total temperature field around the sensor assembly 200 is shown. The reader will note that the temperature of the incoming air flowing through the curved passageway 48 and towards the housing 25 remains at a stable temperature until it engages the housing 25. FIG. 6 also illustrates the very thin thermal boundary layers surrounding the airfoils 33, 34 created by the heating elements 53, 52 respectively. The thermal boundary layers shown in FIG. 6 do not approach or engage in the sensor housing 25.

INDUSTRIAL APPLICABILITY

Total air temperature sensor assemblies are disclosed which include a housing that accommodates a temperature sensor. The housing may be mounted to an inner wall of the nacelle, in front of the fan of a gas turbine engine. Protective airfoils may be coupled to the housing and disposed in front of the housing. The airfoils may be spaced apart and shaped to provide a curved passageway between the airfoils that indirectly guides a flow of incoming air to the sensor housing without creating a wake around the sensor housing. Because of the design of the airfoils and the spacing of the airfoils from the sensor housing, the airfoils can be equipped with heaters to avoid ice formation, but the thermal boundary layers created by the heaters are sufficiently thin so any heated air generated at the airfoil surfaces does not engage the sensor housing.

As shown above and in the drawings, only two airfoils are used to channel airflow to the sensor housing without generating any wakes in the sensor region. The curvatures of the two airfoils are so designed that they prevent water droplets or ice crystals from directly engaging the sensor housing without first engaging the airfoils as shown in FIG. 5. Further, it has been found that disposing the TAT sensor assembly in a spaced-apart relationship from the inner wall of the nacelle enables a greater variation in the angle of attack without compromising the effectiveness of the TAT sensor assembly.

The invention claimed is:

1. A total air temperature sensor assembly, the assembly comprising:
   a housing accommodating a temperature sensor;
   a first airfoil including a leading end and a trailing end, a second airfoil including a leading end and a trailing end, the leading ends of the first and second airfoils are disposed in front of the housing and the first and second airfoils are disposed in a spaced apart fashion to define a curved passageway extending between the first and second airfoils and leading to the housing, wherein airflow entering the curved passageway between the first airfoil and the second airfoil is directed towards and then past the housing without forming wakes or eddvs around the housing, and
   wherein the trailing end of the second airfoil is disposed in front of and spaced apart from the housing.

2. The assembly of claim 1 wherein the leading end of the first airfoil is disposed in front of the leading end of the second airfoil and wherein the total air temperature sensor assembly is configured to prevent water droplets from engaging the housing.

3. The assembly of claim 1 wherein the trailing ends of the first and second airfoils are disposed on opposite sides of the housing and spaced apart from the housing.

4. The assembly of claim 1 wherein the trailing end of the first airfoil is spaced-apart from the housing to provide a first gap between the trailing end of the first airfoil and the housing, the first gap being in communication with the curved passageway.

5. The assembly of claim 1 wherein the trailing end of the second airfoil is spaced-apart from the housing to define a second gap between the trailing end of the second airfoil and the housing, the second gap being in communication with the curved passageway.

6. The assembly of claim 1 wherein the second airfoil includes an inner sidewall extending between the leading and trailing ends of the second airfoil and that faces and defines at least part of the curved passageway, the inner sidewall of the second airfoil being at least partially convex.

7. The assembly of claim 1 wherein the first airfoil includes an inner sidewall extending between the leading and trailing ends of the first airfoil and that faces and defines at least part of the curved passageway, the inner sidewall of the first airfoil being at least partially concave.

8. The assembly of claim 1 wherein the first airfoil includes an inner sidewall extending between the leading and trailing ends of the first airfoil and that faces and defines at least part of the curved passageway, the inner sidewall of the first airfoil including a convex portion and a concave portion with the convex portion disposed between the leading end of the first airfoil and the concave portion.

9. The assembly of claim 1 wherein the first airfoil includes an inner sidewall extending between the leading and trailing ends of the first airfoil and that faces and defines at least part of the curved passageway, the inner sidewall of the first airfoil including a first convex portion, a second convex portion and a concave portion disposed between the first and second convex portions.

10. The assembly of claim 1 wherein the second airfoil includes an outer sidewall extending between the leading and trailing ends of the second airfoil and that faces away from the curved passageway, the outer sidewall of the second airfoil being at least partially convex.

11. The assembly of claim 1 wherein the first airfoil includes an outer sidewall extending between the leading and trailing ends of the first airfoil and that faces away from the curved passageway, the outer sidewall of the first airfoil being at least partially convex.

12. The assembly of claim 1 wherein the first and second airfoils are each coupled to at least one heating element.

13. The assembly of claim 1 wherein the sensor housing and the first and second airfoils are coupled to a backing member which is coupled to a support member for coupling the assembly to a nacelle wall in a spaced-apart relationship.

14. The assembly of claim 1 wherein the housing also accommodates a pressure sensor.

15. A total air temperature and pressure sensor assembly comprising:
    a housing that accommodates a temperature sensor;
    a first airfoil that includes a leading end and a trailing end, a second airfoil that includes a leading end and a trailing end, the leading end of the first airfoil is disposed in front of the leading end of the second airfoil, the first and second airfoils disposed at least partially in front of the housing in a spaced-apart fashion to define a curved passageway extending from the leading end of the second airfoil to the housing, wherein airflow entering the curved passageway between the first airfoil and the second airfoil is directed towards and then past the housing without forming wakes or eddvs around the housing;
    the trailing ends of the first and second airfoils are disposed on opposite sides of the housing and spaced apart from the housing to define a first gap between the trailing end of the first airfoil and the housing and a second gap between the trailing end of the second airfoil and the housing, the first and second gaps being in communication with the curved passageway; and
    wherein the trailing end of the second airfoil is disposed in front of and spaced apart from the housing.

16. The assembly of claim 15 wherein the second airfoil includes an inner sidewall extending between the leading and trailing ends of the second airfoil and that faces and defines at least part of the curved passageway, the inner sidewall of the second airfoil being at least partially convex.

17. The assembly of claim 15 wherein the first airfoil includes an inner sidewall extending between the leading and trailing ends of the first airfoil and that faces and defines at least part of the curved passageway, the inner sidewall of the first airfoil being at least partially concave.

18. The assembly of claim 15 wherein the first airfoil includes an outer sidewall extending between the leading and trailing ends of the first airfoil and that faces away from the curved passageway, the outer sidewall of the first airfoil being at least partially convex; and
    the second airfoil includes an outer sidewall extending between the leading and trailing ends of the second airfoil and that faces away from the curved passageway, the outer sidewall of the second airfoil being at least partially convex.

19. A method of sensing total air temperature of air flowing into a nacelle of a gas turbine engine, the method comprising:
    providing a temperature sensor disposed within a housing mounted to the nacelle in a position to engage incoming air entering the nacelle before said incoming air engages working components of the gas turbine engine;
    providing a first airfoil including a leading end and a trailing end and a second airfoil including a leading end and a trailing end;

positioning the first and second airfoils in a spaced-apart fashion and at least partially in front of the housing to define a curved passageway extending between the first and second airfoils and to the housing; and operating the engine to flow air through the curved passageway and engaging at least one of the first and second airfoils before reaching the housing, wherein airflow entering the curved passageway between the first airfoil and the second airfoil is directed towards and then past the housing without forming wakes or eddys around the housing and wherein the trailing end of the second airfoil is disposed in front of and spaced apart from the housing.

* * * * *